Aug. 31, 1965 H. J. ROWLAND 3,204,205

SIMULTANEOUS RECEIVING AND TRANSMITTING DIPLEXER EMPLOYING STAGGER TUNED STUBS

Filed Nov. 9, 1960 3 Sheets-Sheet 1

*INVENTOR.*

HOWARD J. ROWLAND

*BY*

Porter, Chittick, Russell & Pfund

ATTORNEYS

INVENTOR.
HOWARD J. ROWLAND
BY
Porter, Chittick, Russell & Pfund
ATTORNEYS

Aug. 31, 1965 H. J. ROWLAND 3,204,205

SIMULTANEOUS RECEIVING AND TRANSMITTING DIPLEXER EMPLOYING STAGGER TUNED STUBS

Filed Nov. 9, 1960 3 Sheets-Sheet 3

INVENTOR.

HOWARD J. ROWLAND

BY

Porter, Chittick, Russell & Pfund

ATTORNEYS

United States Patent Office 3,204,205

Patented Aug. 31, 1965

3,204,205
SIMULTANEOUS RECEIVING AND TRANSMITTING DIPLEXER EMPLOYING STAGGER TUNED STUBS

Howard J. Rowland, Egypt, Mass., assignor to Electronic Specialty Co., a corporation of California Filed Nov. 9, 1960, Ser. No. 70,871
7 Claims. (Cl. 333—9)

This invention relates generally to microwave transmission systems and more particularly to high power microwave systems in which transmission and reception simultaneously occur.

Various arrangements have been provided in the past for operating high power microwave transmitting and receiving equipment with the same antenna serving both transmitter and receiver. In conventional pulse radar systems, for example, a duplexing arrangement is generally employed which takes advantage of the on-off characteristic of the pulse transmission for altering, generally by means of a gas discharge tube, the waveguide path through which energy will travel to and from the antenna. In other classes of service, particularly where communication signals are to be transmitted by microwave, the problem of continuous operation of a high power transmitter and a receiver with the same antenna generally requires some offset between the transmitted and received frequency in order that the required isolation between the transmitter and receiver may be maintained. A similar problem arises where a microwave equipment with broad band characteristics and particularly one with pulse modulation is operated in close proximity to receiving equipment which is only removed in frequency by a small amount from the transmitted microwave carrier since the side bands generated with the transmitted signal may very well fall in the receiver band width and thus present a strong locally generated signal capable of blocking the receiver and preventing the reception of the desired signal from a remote station. For the successful operation of equipment in the aforementioned categories and similar services, it is necessary to eliminate the side band transmission from high power microwave transmitters by the use of a suitable band pass filter at the transmitted frequency and which is capable of transmitting the high power microwave energy from the transmitter to the antenna. For the simultaneous and continuous operation of receiving equipment only a small frequency increment removed from the transmitted carrier frequency, it is also necessary that a diplexer arrangement be provided which maintains a high degree of isolation between the transmitter and receiver microwave branches.

The degree of isolation required may in many instances call for an attenuation of 100 db or more. To achieve this order of attenuation and yet provide the power transmission capabilities of high power systems where the peak power levels may exceed one megawatt imposes severe limitations on the microwave filter structure employed. Microwave filters which have been known in the past are not generally adequate for such high power service or if capable of handling the required power generally do not provide the band width or attenuation required.

It is accordingly an object of the present invention to provide an improved high power microwave filter structure which is easily adjusted to provide broad band operation.

A further object of the invention is to provide an improved microwave filter element which has stagger tuned elements which can be adjusted relatively independently of each other.

Another object of the invention is to provide a new and improved diplexer employing microwave filter elements which operates to isolate effectively a transmitter and receiver in the microwave region separated by as little as fifty megacycles.

A further object is to provide an improved diplexer which is readily adjusted for broad band operation in the microwave region.

These and other objects of the invention will be apparent from the following detailed description taken in conjunction with the accompanying drawings wherein.

In accordance with the invention a microwave filter element employing a plurality of tuning stubs is arranged with power dividing vanes within the filter waveguide path which permit the tuning stubs to be stagger tuned relatively independently of each other to provide substantially complete transmission for a wide pass band to which the assembly is matched while providing a high order of attenuation in a reject frequency band adjacent the pass band as determined by the tuning of the tuning stubs of the filter. By connecting two such filter elements to the ports of a symmetrical wave guide Y-junction which provides an electrically symmetrical and matched transmission path between the two filters and the remaining port of the Y-junction, a diplexer structure is provided with one of the filter branches being tuned to pass the transmitted frequency and reject the received frequency while the opposite filter branch is tuned to pass the received frequency and reject the transmitted frequency.

Figures 1, 2:
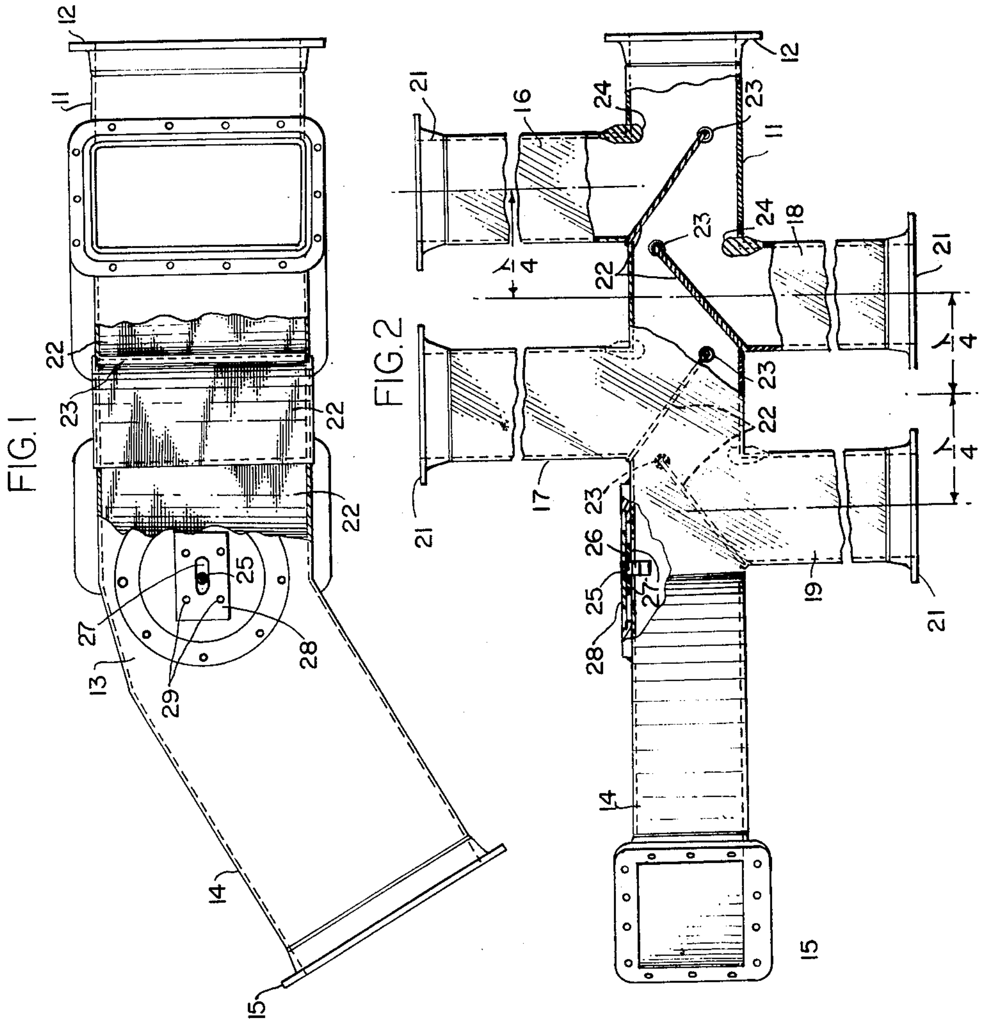
FIG. 1 is an elevation view of a filter element constructed in accordance with the invention with a portion broken away to show the interior structure.
FIG. 2 is a plan view of the filter element of FIG. 1 with a portion of the waveguide broken away to show interior structure.

Referring now to FIGS. 1 and 2, a filter constructed in accordance with the invention for operation in a particular frequency region comprises a rectangular waveguide 11 which provides a straight transmission path between a connecting flange 12 and a small angle bend section 13 which connects through a waveguide section 14 with a flange connector 15. The waveguide section 11 communicates with two pairs of oppositely directed tuning stub waveguides 16, 17 and 18, 19. The waveguide stubs 16, 17, 18, and 19 are welded or otherwise integrally connected at approximately quarter wave length spacing with the broad wall of the waveguide section 11, as shown, and communicate therewith through full size openings in the broad waveguide wall corresponding with the interior dimensions of the stubs 16–19. The waveguide stubs 16–19 are of considerable length as will hereinafter appear. The waveguides 16–19 terminate in flange connectors 21 to which are secured the short circuiting tuning plungers and adjusting assemblies to be hereinafter described.

A set of dividing vanes 22 are provided projecting at an angle of approximately 36° from the horizontal in FIG. 2. The vanes 22 extend completely across the broad dimension of the waveguide 11 (FIG. 1) to make electrical contact with the opposite narrow walls. The vanes 22 are secured across the broad wall of waveguide 11 at the point of intersection with the respective stubs 16–19 and project diagonally across the narrow dimension of waveguide 11 to terminate with predetermined spacing from the opposite interior surface of the waveguide wall. The terminal edge of the vanes 22 is modified with a rounded cylindrical bead 23 of conductive material for the purpose of reducing corona and raising the power level at which breakdown across the guide will occur. The actual spacing between the bead 23 and the opposite wall of waveguide 11 will be determined by the power handling requirements imposed upon the filter structure. From the opposite wall of the waveguide 11 a short conductive matching projection 24 may be used to provide an impedance match with the vane structure 22.

The filter element of FIGS. 1 and 2 is adjusted by varying the electrical length of the stub tuners 16–19 in accordance with the desired rejection band for the filter. This adjustment in each tuning stub 16–19 is relatively independent of the setting of the other stubs since the vanes 22 tend to isolate them with respect to each other. To match the filter in the pass band and provide a suitably low standing wave ratio, a conductive probe 25 is supported by threaded engagement with a slidable plate 26 to permit the screw projection 25 to slide in an elongated slot 27 which is cut in the wall of waveguide 11. A clamping plate 28 is arranged to provide clamping action of the slidable block 26 by fastening means such as screws 29 in order to provide longitudinal positioning of the tuning probe 25 in the waveguide 11. The depth of insertion of the tuning cylinder 25 into the waveguide is determined by the rotation of the tuning screw 25 in threaded engagement with the sliding plate 26.

Figure 3:
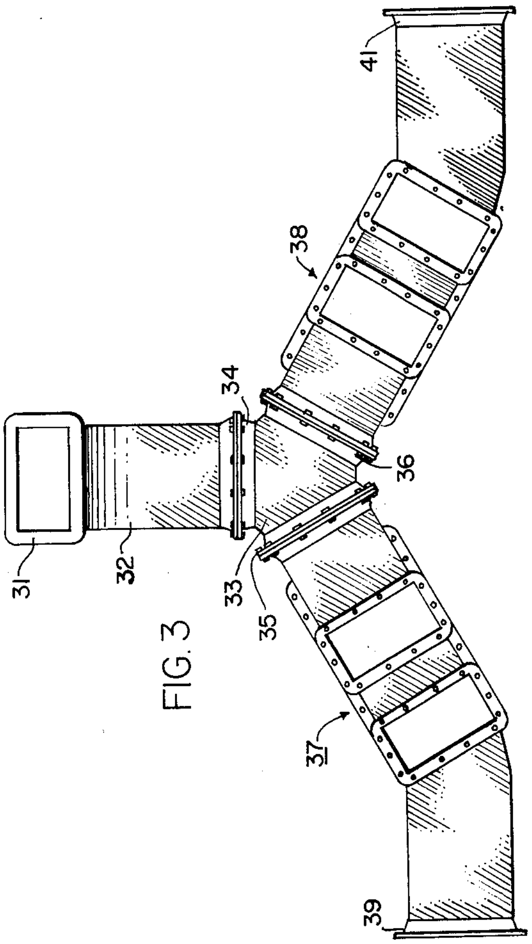
FIG. 3 is an elevation view of a diplexer constructed in accordance with the invention using two filter elements as described in FIGS. 1 and 2.

Referring now to FIG. 3 a diplexer in accordance with the invention is shown which employs two of the filter elements described in connection with FIGS. 1 and 2. The diplexer includes an antenna flange connection 31 for connecting to a waveguide which supplies a common transmitting and receiving antenna of the system. The antenna flange 31 is connected by a waveguide section 32 to one port of a symmetrical Y-junction 33. The Y-junction 33 is a waveguide structure having three symmetrically arranged flanges 34, 35 and 36 which have internal dimensions corresponding to the waveguide with which they are used and which have a center line angular relation of 120°. Thus the structure is completely symmetrical with respect to the ports 34, 35 and 36 and any particular port may be utilized for connection with waveguide 32. In the arrangement shown, with flange 34 connected to the antenna waveguide of the system, the remaining flanges 35, 36 are connected to respective filters 37, 38 which provide at flange 39 for connection to a transmitter and at flange 41 for connection to a receiver. With this arrangement the pass band of filter 37 is adjusted for minimum standing wave ratio after the reject band of filter 37 is tuned to correspond to the pass band of filter 38. Similarly the reject band of filter 38 is tuned to correspond to the pass band of filter 37 and the matching adjustment of filter 38 is made at its pass band frequency. The diplexer is capable when thus adjusted of providing 100 db isolation between the transmitter and the receiver connected to flanges 39 and 41, respectively.

Figure 4:
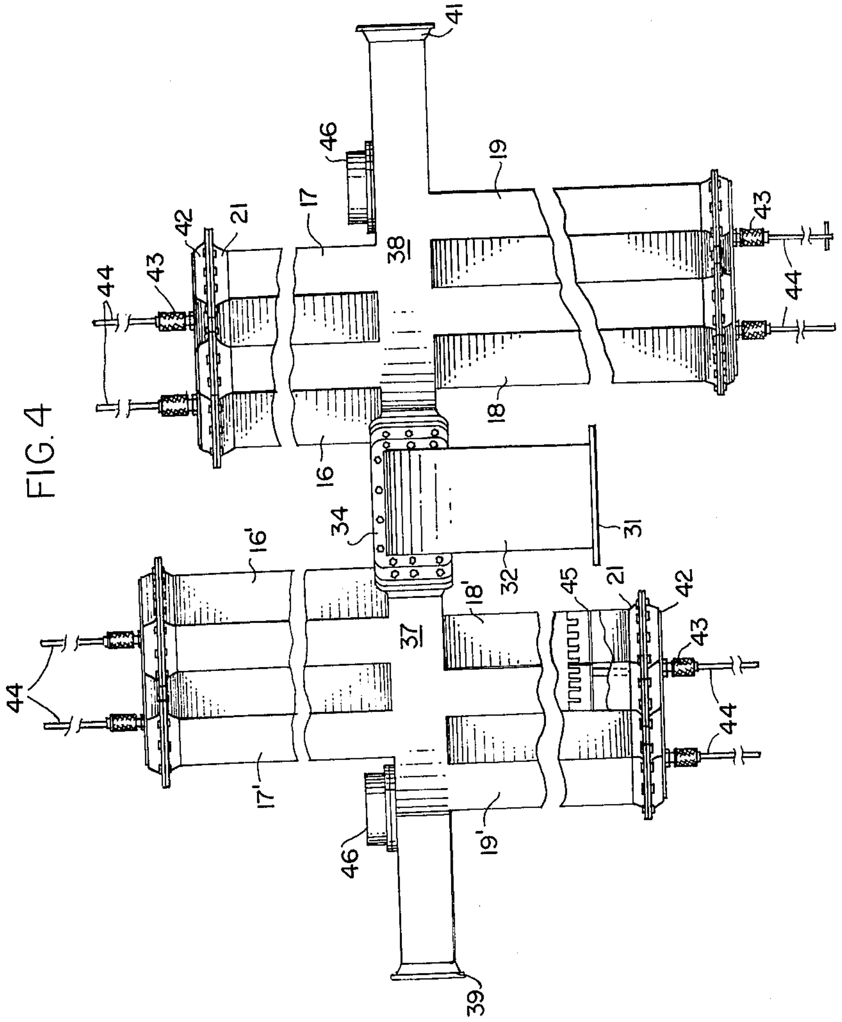
FIG. 4 is a plan view of the diplexer of FIG. 3.

Referring now to FIG. 4 the arrangement for tuning the filters of the diplexer of FIG. 3 will be described. Each of the tuning stubs 16–19 and 16′–19′ of the two filter assemblies terminates in a flange 21 to which is connected a mating flange assembly 42 which supports a compression shaft locking assembly 43. The assembly 43 may be of the type generally provided for locking potentiometer shafts or the like and in this instance is provided to support for axial sliding movement shaft 44 which is connected to a short circuiting tuning plunger 45 for the waveguide stubs 16–19. The short circuiting plungers 45 may have conventional spring biased conductive fingers for making good electrical contact with the interior walls of the waveguide stubs 16–19. With this arrangement the locking assemblies 43 may be loosened and the rod 44 employed to adjust the axial position of the short circuiting plates 45 within the waveguide stubs 16–19. A similar tuning procedure may be followed for the tuning stubs 16′–19′. When the final position of the short circuiting plungers 45 is established, the clamping assembly 43 may be engaged to maintain the adjusted position thereof. Alternatively, a vernier screw adjustment for the axial position of the rod 44 may be incorporated within the clamping assembly 43. Also shown in FIG. 4 are cover caps 46 for the assembly associated with matching stubs 25.

As previously stated, the tuning stubs 16–19 and 16′–19′ are of considerable length and in each case are of sufficient length to permit the stubs to be adjusted to an odd multiple number of quarter wavelengths at the reject frequency and an even number of quarter wavelengths at the pass frequency. In order for these conditions to prevail, the number of quarter wavelengths for the tuning stubs will be considerable and the less the separation between the reject and pass bands the higher number of multiples of quarter wavelengths will be required. Where the reject frequency is lower than the pass frequency, the adjustment for the reject band will be shorter by one quarter wavelength than the length in quarter wavelengths at the pass band. For the opposite case where the reject frequency is the higher frequency, the stubs will be adjusted to have an odd number of quarter wavelengths at reject wavelength which is one quarter wavelength greater than the number of quarter wavelengths at the pass band. The relations between the reject and the pass wavelength conditions are shown by the following table where *n* is an integer.

*Table I*

| Adjusted Length | Equivalent Pass Band Length | Operating Conditions |
|---|---|---|
| $\frac{n\lambda_{reject}}{4}=$ | $\frac{(n+1)\lambda_{pass}}{4}$ | Reject lower frequency and pass higher frequency. |
| $\frac{n\lambda_{reject}}{4}=$ | $\frac{(n-1)\lambda_{pass}}{4}$ | Reject higher frequency and pass lower frequency. |

In order to make the system broad band the actual adjustment of the four tuning stubs is staggered in accordance with conventional stagger tuning techniques to provide the desired pass band. In adjusting the diplexer the adjusted lengths for the reject frequency are established for the short circuiting plungers 45 in each of the tuning stubs in accordance with the foregoing table. The system is then energized with energy at the pass band and the adjustment of the matching stub 25 is made to obtain a satisfactory standing wave ratio for the pass band energy.

Figure 5:
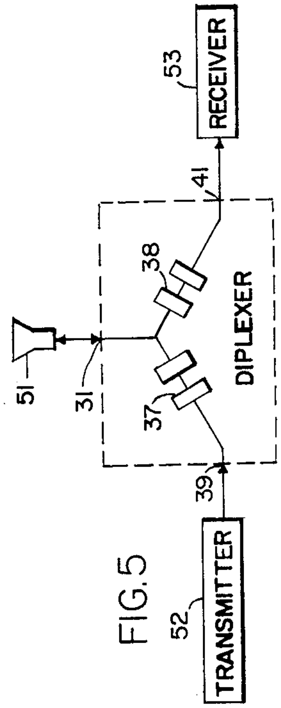
FIG. 5 is a block diagram of a system for simultaneous transmission and reception employing the diplexer of the invention.

Referring now to FIG. 5 one arrangement for using the diplexer of the present invention is shown in which an antenna 51 is connected to the antenna connection 31 of the diplexer while a transmitter is connected to the transmitter input 39 and a receiver is connected to the receiver output 41. With this arrangement relatively high power from the transmitter 52 can be transmitted through filter 37 to the antenna 51 with substantially no attenuation. Substantially no power of transmitter frequency will be transmitted to the receiver 53 since the receiver filter 38 is tuned to reject the transmitter frequency. Any sideband energy at a frequency removed 50 megacycles or more from the transmitted frequency corresponding to the reject frequency of the transmitter filter 37 likewise will not reach the receiver. What small portion of power at the transmitted frequency arrives at the input terminals of the receiver 53 is further attenuated by the selectivity circuits in the receiver 53. Energy arriving at the antenna 51 at the frequency of receiver 53, however, passes unattenuated through the receiver filter 38 to the receiver 53 and is not dissipated by passing into the channel of the transmitter 52 since the filter 37 rejects the received frequency. Thus in the diplexer the filters are adjusted so the pass-reject band of one filter corresponds to the reject-pass band of the other filter, i.e., the filters have reciprocal pass-reject bands.

While the invention has been described with respect to a specific embodiment, it will be apparent to those skilled in the art that modifications may be made without departing from the spirit of the invention. For example, the equilateral three port junction 33 may be replaced by a conventional 90° T-junction if proper measures are taken to provide an impedance match to compensate for the assymetry of the 90° T-junction. Various other modifications will be apparent and are to be understood as within the scope of the invention.

I claim:

1. A microwave filter comprising a section of rectangular waveguide, a plurality of rectangular waveguide tuning stubs coupled to the broad wall of said section at approximately one-quarter wave length intervals and a plurality of conductive vanes each joined to one broad wall of said section and extending completely across the broad dimension and partially across the narrow dimension of said section from the respective regions of intersection of said section with one wall of each of said stubs, said vanes being of such size and inclined at an angle to project substantially beyond the center line of said section and entirely across the projected area of said stubs.

2. A microwave filter comprising a section of rectangular waveguide, four waveguide tuning stubs alternately projecting from the opposite broad walls of said section at approximately quarter-wavelength intervals, conductive vanes coextensive with the broad dimension of said section at the intersection of said section with one wall of each of said stubs, said vanes projecting therefrom at an angle to the longitudinal axis of said section to extend partially across the narrow dimension of said section and the projected area of said stub.

3. Apparatus according to claim 2 in which said stubs are of length corresponding to a plurality of quarter wavelengths and are provided with adjustable short circuiting plungers.

4. A microwave filter comprising a section of waveguide, a plurality of transverse conductive vanes alternately extending from opposite interior walls of said section at approximately quarter-wavelength intervals at the frequency of operation, said vanes being inclined at an angle to the longitudinal axis of said section, and an adjustable tuning stub projecting from the broad walls of said section at each position on said section at which one of said vanes extends within said section.

5. A diplexer comprising a rectangular waveguide Y-junction having three ports mutually symmetrically arranged; an output connection to one of said ports; a pair of microwave filters connected to the remaining ports of said Y-junction, each of said filters including a section of rectangular waveguide; a plurality of rectangular waveguide tuning stubs coupled to the broad wall of said section at approximately quarter-wavelength intervals and a transverse conductive vane extending partially across said section from the regions of intersection of said section with one wall of each of said stubs; and means for coupling of said transmission and reception means of different operating frequencies respectively to said filters, said filters being adjusted for reciprocal pass-reject bands with the pass bands in each case corresponding to the frequency of operation of the respective means coupled thereto.

6. A diplexer having a matched waveguide three-port; an output connection to one of said ports; a pair of microwave filters connected to the remaining ports of said three-port, each of said filters including a section of rectangular waveguide; a plurality of rectangular waveguide tuning stubs coupled to the broad wall of said section at approximately quarter-wavelength intervals and a transverse conductive vane extending partially across said section from the regions of intersection of said section with one wall of each of said stubs; and means for coupling of said transmission and reception means of different operating frequencies respectively to said filters, said filters being adjusted for reciprocal pass-reject bands with the pass bands in each case corresponding to the frequency of operation of the respective means coupled thereto.

7. A diplexer comprising a matched rectangular waveguide T-junction having three ports; an output connection to one of said ports; a pair of microwave filters connected to the remaining ports of said matched T-junction, each of said filters including a section of rectangular waveguide; a plurality of rectangular waveguide tuning stubs coupled to the broad wall of said section at approximately quarter-wavelength intervals and a transverse conductive vane extending partially across said section from the regions of intersection of said section with one wall of each of said stubs; and means for coupling transmission and reception means of different operating frequencies respectively to said filters, said filters being adjusted for reciprocal pass-reject bands with the pass bands in each case corresponding to the frequency of operation of the respective means coupled thereto.

References Cited in the file of this patent

UNITED STATES PATENTS

| | | |
|---|---|---|
| 2,816,270 | Lewis | Dec. 10, 1957 |
| 2,853,682 | Epstein | Sept. 23, 1958 |
| 2,860,309 | Zaleski | Nov. 11, 1958 |
| 2,861,245 | Krause | Nov. 18, 1958 |
| 2,984,798 | Bryan | May 16, 1961 |
| 3,009,117 | Lanctot | Nov. 14, 1961 |

OTHER REFERENCES

Southworth: Principles and Applications of Waveguide Transmission, Van Nostrand Co. Inc., 1950, pages 244 to 247 relied upon.